United States Patent
Ito et al.

(10) Patent No.: US 7,241,717 B2
(45) Date of Patent: Jul. 10, 2007

(54) CATHODE CATALYST FOR FUEL CELL

(75) Inventors: Tetsuo Ito, Ogasa-gun (JP); Tomoaki Terada, Ogasa-gun (JP); Hisao Kato, Nisshin (JP); Tetsuo Nagami, Nagoya (JP)

(73) Assignees: Cataler Corporation, Shizuoka (JP); Toyota Jidosha Kabushiki Kaisha, Toyota (JP)

( * ) Notice: Subject to any disclaimer, the term of this patent is extended or adjusted under 35 U.S.C. 154(b) by 149 days.

(21) Appl. No.: 10/967,200

(22) Filed: Oct. 19, 2004

(65) Prior Publication Data

US 2005/0164074 A1   Jul. 28, 2005

(30) Foreign Application Priority Data

Oct. 23, 2003   (JP)   ............ 2003-363734

(51) Int. Cl.
*B01J 23/00* (2006.01)
*B01J 23/40* (2006.01)
*B01J 23/74* (2006.01)
*B01J 21/18* (2006.01)

(52) U.S. Cl. ............ 502/326; 502/329; 502/334; 502/336; 502/338; 502/339; 502/350; 502/185

(58) Field of Classification Search ............ 502/185, 502/258, 261, 262, 313, 316, 326, 327, 329, 502/334, 336, 338, 339, 350, 355, 415, 439
See application file for complete search history.

(56) References Cited

U.S. PATENT DOCUMENTS 3,342,628 A * 9/1967 Sinclair .............. 427/431
3,475,224 A * 10/1969 Adlhart et al. .............. 429/13
4,970,128 A * 11/1990 Itoh et al. .............. 429/42
5,593,934 A   1/1997 Stonehart (Continued)

FOREIGN PATENT DOCUMENTS

CN   1404178 A   3/2003

(Continued)

OTHER PUBLICATIONS

J. Shim et al.; "Characteristics for electrocatalytic properties and hydrogen-oxygen adsorption of platinum ternary alloy catalysts in polymer electrolyte fuel cell"; *Electrochimica Acta*; vol. 45; 2000; pp. 1943-1951.

*Primary Examiner*—Cam N. Nguyen
(74) *Attorney, Agent, or Firm*—Oliff & Berridge, PLC

(57) ABSTRACT

It is an object of the present invention to provide a cathode catalyst for fuel cells containing platinum and iron which can maintain the durability of a battery and can make a battery high output. The cathode catalyst for fuel cells comprises a supporting layer which consists of an alloy containing platinum and iron and further containing the third component which has an affinity for iron including one or more sorts of elements selected from the group consisting of tungsten, titanium, molybdenum, rhenium, zinc, manganese, tin, tantalum and rhodium, and a support on which the supporting layer is loaded. A catalyst using an alloy containing platinum and iron enables the batteries to become high output. By alloying one or more sorts of elements of the third component which has an affinity for iron with an alloy containing platinum and iron, it is possible to prevent eluting of the iron into the electrolyte.

3 Claims, 1 Drawing Sheet

U.S. PATENT DOCUMENTS

| | | | |
|---|---|---|---|
| 5,767,036 A * | 6/1998 | Freund et al. | 502/185 |
| 5,814,149 A * | 9/1998 | Shintani et al. | 117/104 |
| 5,876,867 A * | 3/1999 | Itoh et al. | 429/44 |
| 6,309,772 B1 * | 10/2001 | Zuber et al. | 429/33 |
| 7,037,873 B2 * | 5/2006 | Kato | 502/180 |
| 2004/0161641 A1 | 8/2004 | Lee et al. | |

FOREIGN PATENT DOCUMENTS

| | | |
|---|---|---|
| CN | 1523695 A | 8/2004 |
| EP | 0 994 520 A1 | 4/2000 |
| JP | A-60-007941 | 1/1985 |
| JP | A-05-217586 | 8/1993 |
| JP | A-09-161811 | 6/1997 |
| JP | A-10-069914 | 3/1998 |
| JP | A-2001-224969 | 8/2001 |
| JP | A-2001-325964 | 11/2001 |
| JP | A-2004-079438 | 3/2004 |
| JP | 2004-253385 | 9/2004 |
| WO | WO 94/10715 A1 | 5/1994 |
| WO | WO 03/071621 A2 | 8/2003 |
| WO | WO 03/077337 A1 | 9/2003 |

* cited by examiner

CATHODE CATALYST FOR FUEL CELL

BACKGROUND OF THE INVENTION

1. Field of the Invention

The present invention relates to a cathode catalyst for fuel cells. More specifically, it relates to a cathode catalyst for fuel cells which contains an alloy of platinum, iron and the third component including one or more sorts of elements selected from the group consisting of tungsten, titanium, molybdenum, rhenium, zinc, manganese, tin, tantalum and rhodium.

2. Description of the Related Art

As for a catalyst used for the cathode of fuel cells, platinum has been conventionally used. In this case, it is known that, by alloying platinum and iron and using thereof for a cathode catalyst, the activity of oxygen reduction will be increased, so the batteries can become high output.

For instance, Japanese Unexamined Patent Publication (KOKAI) No. 60-7941 discloses an electrode catalyst containing a super-lattice structure platinum-iron alloy dispersed on the supports.

However, in a case where the acid electrolyte which consists of a high polymer material having $SO_3H$ group, such as a perfluorocarbon acid ionomer, is used as the electrolyte of a fuel cell and the cathode catalyst of a fuel cell is made to contain a platinum-iron alloy, it may arise that the iron contained in a platinum-iron alloy elutes into the electrolyte of a fuel cell. That is, the electrolyte will become strong acid when having $SO_3H$ group and swelled with water. In such a case, if the cathode catalyst of a fuel cell is made to contain a platinum-iron alloy, a base metal like iron will be eluted out as ions. The eluting ions are ion-exchanged with the proton in the electrolyte, i.e., $H^+$ of $SO_3H$ group. This leads to deterioration of the conductivity of the high polymer electrolyte. As a result, it will arise the problem that the battery performance will be lowered and the life span of a fuel cell is unable to be extended.

SUMMARY OF THE INVENTION

It is therefore an object of the present invention to provide a cathode catalyst for fuel cells containing platinum and iron which can maintain the durability of a battery and can make a battery high output.

As a result of diligent study by the present inventors, they have invented a cathode catalyst for fuel cells used for the cathode of fuel cells comprising: a supporting layer which consists of an alloy containing platinum and iron and further containing the third component which has an affinity for iron including one or more sorts of elements selected from the group consisting of tungsten, titanium, molybdenum, rhenium, zinc, manganese, tin, tantalum and rhodium, and a support on which said supporting layer is loaded.

Namely, by adding platinum and iron and further adding the third component which has an affinity for iron including one or more sorts of elements selected from the group consisting of tungsten, titanium, molybdenum, rhenium, zinc, manganese, tin, tantalum and rhodium, and alloying preferentially iron and the element included in these third components, it is possible to prevent eluting of the iron into the electrolyte membrane. It is also possible to extend the life span of cathode catalysts. Further, since it contains platinum and iron, it is possible to make the batteries high output by increasing the reaction of oxygen reduction.

By using the cathode catalyst for fuel cells of the present invention, eluting of the iron which causes degradation of an electrolyte membrane can be prevented, and the durability of a fuel cell can be maintained. Moreover, since it contains iron, the batteries can be made high output.

BRIEF DESCRIPTION OF THE DRAWINGS

The form for carrying out the cathode catalyst for fuel cells of the present invention is explained below. A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
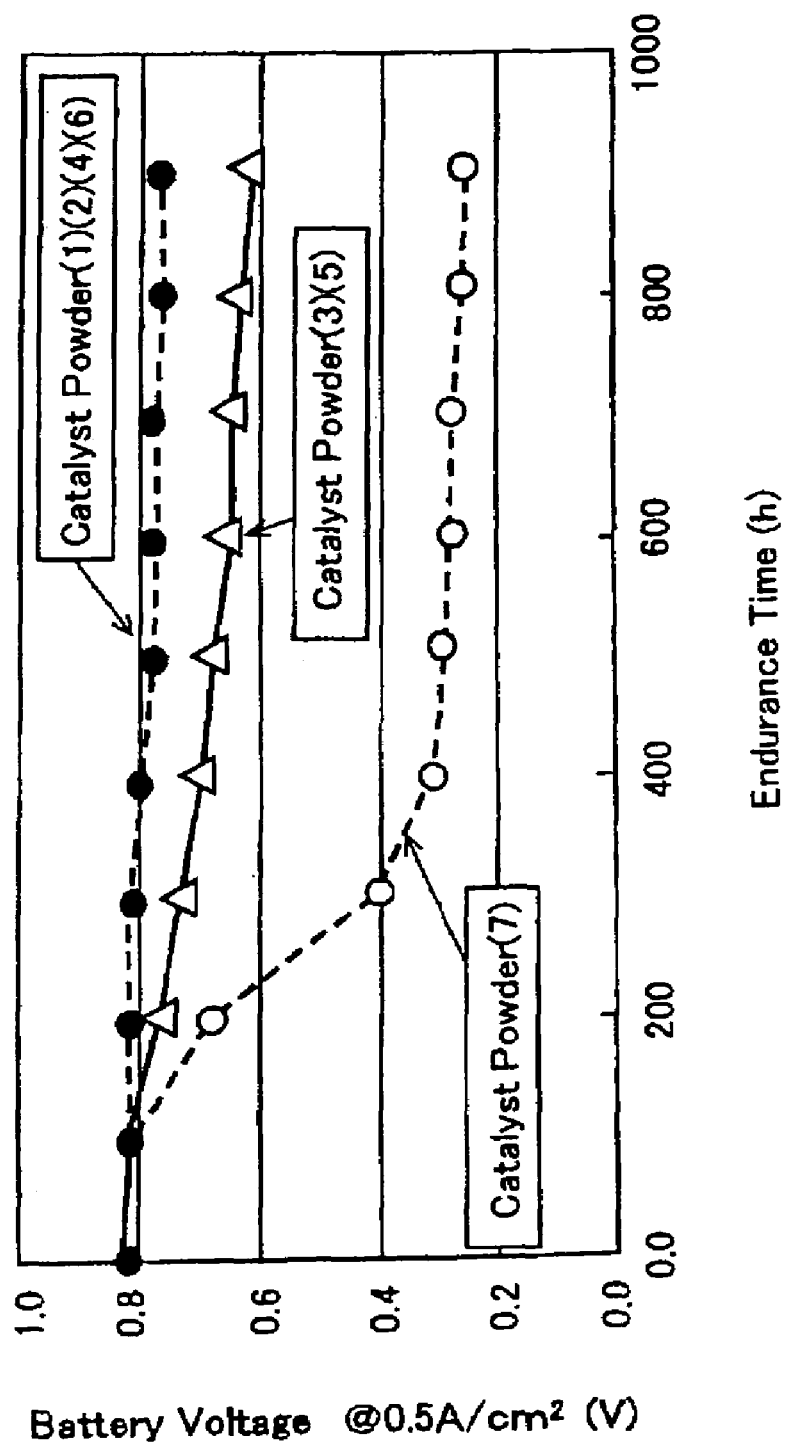
FIG. 1 illustrates the result of a comparative examination.

A cathode catalyst for fuel cells is used as a cathode of fuel cells, namely, as the side of the electrode to which an oxidizing agent is supplied. For instance, in hydrogen-oxygen fuel cells, it can be used as a catalyst of the oxygen electrode.

The cathode catalyst for fuel cells of the present invention is characterized in having a supporting layer which consists of an alloy containing platinum and iron and further containing the third component which has an affinity for iron including one or more sorts of elements selected from the group consisting of tungsten, titanium, molybdenum, rhenium, zinc, manganese, tin, tantalum and rhodium, and a support on which the supporting layer is loaded.

A supporting layer of the cathode catalyst for fuel cells of the present invention consists of an alloy containing platinum and iron and further containing the third component which has an affinity for iron including one or more sorts of elements selected from the group consisting of tungsten, titanium, molybdenum, rhenium, zinc, manganese, tin, tantalum and rhodium.

That is, as for an alloy used here, an alloy which further added one sort of elements of the third component to platinum and iron can be used, i.e., a platinum-iron-tungsten alloy, a platinum-iron-titanium alloy, a platinum-iron-molybdenum alloy, a platinum-iron-rhenium alloy, a platinum-iron-zinc alloy, a platinum-iron-manganese alloy, a platinum-iron-tin alloy, a platinum-iron-tantalum alloy, a platinum-iron-rhodium alloy, etc. Further, it is possible to arbitrarily combine two or more sorts of elements of the third component with platinum and iron, like a platinum-iron-tungsten-molybdenum alloy.

The ratio between platinum, iron and the third component can be, when platinum is taken as 100 by weight, iron approximately 0.5-10 by weight, and the third component approximately 5-50 by weight.

Among these alloys, the alloy which consists of platinum, iron and tungsten, and the alloy which consists of platinum, iron and titanium are preferable. It is because a platinum-iron-tungsten alloy and a platinum-iron-titanium alloy show excellent durability as a cathode catalyst for fuel cells. That is, it is because eluting of the iron into an electrolysis solution or an electrolysis membrane is prevented.

In the case of a platinum-iron-tungsten alloy, when platinum is taken as 100 by weight, iron can be approximately 0.5-10 by weight, tungsten approximately 5-50 by weight. More preferably, iron can be approximately 1.0-3.0 by weight and tungsten approximately 20-30 by weight.

In the case of a platinum-iron-titanium alloy, when platinum is taken as 100 by weight, iron can be approximately 0.5-10 by weight, titanium approximately 5-20 by weight.

Moreover, in addition to platinum, iron and metal of the third component, it is also possible to further contain metal other than these. For example, cobalt, nickel, chromium, etc. can be listed, however, it is not limited to these.

The support of the cathode catalyst for fuel cells of the present invention is a support on which the supporting layer mentioned above is loaded. A material suitable for such a support can be used. For instance, carbon materials, such as a carbon powder, etc. can be used, however, it is not limited to this.

In addition, the ratio of a support and a supporting layer can be approximately 100 by weight of a support and 5-70 by weight of a supporting layer. More preferably, a supporting layer can be 20-60 by weight.

The cathode catalyst for fuel cells of the present invention can be produced by loading platinum, iron and an element of the third component on a material which is used as a support, such as a carbon powder, thereafter performing reducing treatment, alloying, washing and vacuum drying.

The cathode catalyst for fuel cells of the present invention produced in such a manner can be used in loading a cathode for fuel cells. In this case, it is suitable to use as a cathode catalyst of a polymer electrolyte fuel cell. As described above, in a case where the acid electrolyte which consists of a polymer having $SO_3H$ group, such as a perfluoro acid ionomer, is used as the electrolyte of a polymer electrolyte fuel cell, the electrolyte will become strong acid when swelled with water. In such a case, if the cathode catalyst of a fuel cell is made to contain a platinum-iron alloy, a base metal like iron will be eluted out as ions. In the present invention, however, since an element of the third component is also alloyed, eluting of the iron can be prevented.

In addition, as material which can be used as a cathode for fuel cells, the material of carbon group, such as a carbon cloth and a carbon paper, can be used. However, it is not limited to these. It can be used to load by the suitable method for such material.

EXAMPLES

Example No. 1

First, 6.0 g of carbon powder were added to 1.0 L of hexahydroxy-platinate nitrate solution containing 3.6 g of platinum and the carbon powder was sufficiently dispersed in this solution. Then, the resulting solution in which the carbon powder was dispersed was filtered and washed to obtain carbon powder on which platinum was loaded.

This carbon powder was uniformly dispersed in 0.5 L of deionized water, and 0.1 L of iron nitrate aqueous solution containing 0.2 g of iron was further added. Thereafter, 6% by mass of the aqueous ammonia was dripped into the aqueous solution so that the pH (Hydrogenion exponent) was adjusted to 5.0-8.0, and iron hydroxide was precipitated. Filtering and washing of this aqueous solution which iron hydroxide was precipitated was carried out to obtain a carbon powder on which platinum and iron were loaded.

This carbon powder was uniformly dispersed in 0.5 L of deionized water, and 0.2 L of ammonium tungstate para pentahydrate aqueous solution containing 0.2 g of tungsten was further added. Next, nitrate solution was dripped into the aqueous solution until the pH became 1.0 or less, and tungsten trioxide was precipitated. Filtering and washing of this aqueous solution which tungsten trioxide was precipitated was carried out to obtain a carbon powder on which platinum, iron and tungsten were loaded.

Reducing treatment was performed to the resulting carbon powder at 600° C. in a hydrogen atmosphere for 0.5-1.0 hours, and subsequently alloying treatment was carried out at 650° C. in a nitrogen atmosphere for one hour. Then, this alloying treated powder was sufficiently washed with deionized water, dried in a vacuum drier at 100° C. for 4 hours to obtain a carbon catalyst powder loading a platinum-iron-tungsten alloy (1).

This carbon catalyst powder loading a platinum-iron-tungsten alloy (1) had a platinum loading density of 36% by mass, an iron loading density of 2% by mass and a tungsten loading density of 2% by mass.

Moreover, the particle diameter of an alloy of this carbon catalyst powder loading a platinum-iron-tungsten alloy (1) was measured by X-ray diffraction (XRD), it was 2.5-4.0 nm.

In addition, the particle diameter of an alloy was calculated from the peak position (around 40 degree) which belongs to (111) surface at half height. A platinum-iron-$\alpha$-alloy is subject to distortion of a crystal when alloying, and the peak position which belongs to (111) surface is shifted to a high angle side. The peak position, which belongs to (111) surface of an alloy of this carbon catalyst powder loading a platinum-iron-tungsten alloy (1) in X-ray diffraction, was 40.1 degree and alloying was confirmed.

Example No. 2

By the same way as Example 1, 3.7 g of platinum and 0.2 g of iron were loaded on 6.0 g of carbon powder.

This carbon powder was uniformly dispersed in 0.5 L of deionized water, and 0.2 L of titanium chloride aqueous solution containing 0.1 g of titanium was further added. Subsequently, 1 g of sodium borohydride were added to this aqueous solution as a reducing agent. Such solution was filtered and washed to obtain a carbon powder on which platinum, iron and titanium were loaded.

Reducing treatment, an alloying treatment, washing and vacuum drying was performed to this carbon powder like Example 1 to obtain a carbon catalyst powder loading a platinum-iron-titanium alloy (2).

This carbon catalyst powder loading a platinum-iron-titanium alloy (2) had a platinum loading density of 37% by mass, an iron loading density of 2% by mass and a titanium loading density of 1% by mass.

Moreover, the particle diameter of an alloy of this carbon catalyst powder loading a platinum-iron-titanium alloy (2) was measured by X-ray diffraction (XRD), it was 3.5-6.0 nm. In addition, the peak position, which belongs to (111) surface of an alloy of this catalyst powder (2) in X-ray diffraction, was 40.4 degree and alloying was confirmed.

Example No. 3

By the same way as Example 1, 3.6 g of platinum and 0.2 g of iron were loaded on 6.0 g of carbon powder.

This carbon powder was uniformly dispersed in 0.5 L of deionized water, and 0.2 L of molybdenum chloride aqueous solution containing 0.2 g of molybdenum was further added. Then, 1 g of sodium borohydrate was added to this aqueous solution as a reducing agent. Such solution was filtered and washed to obtain a carbon powder on which platinum, iron and molybdenum were loaded.

Reducing treatment, an alloying treatment, washing and vacuum drying was performed to this carbon powder like Example 1 to obtain a carbon catalyst powder loading a platinum-iron-molybdenum alloy (3).

This carbon catalyst powder loading a platinum-iron-molybdenum alloy (3) had a platinum loading density of 36% by mass, an iron loading density of 2% by mass and a molybdenum loading density of 2% by mass.

Moreover, the particle diameter of an alloy of this carbon catalyst powder loading a platinum-iron-molybdenum alloy (3) was measured by X-ray diffraction (XRD), it was 3.0-5.0 nm. Further, the peak position, which belongs to (111) surface of an alloy of this catalyst powder (3) in X-ray diffraction, was 40.3 degree and alloying was confirmed.

Example No. 4

6.0 g of carbon powder were added to 1.0 L of hexahydroxy platinate nitrate solution containing 3.7 g of platinum and the carbon powder was sufficiently dispersed in this solution. Then, 0.1 L of iron nitrate aqueous solution containing 0.2 g of iron and titanium chloride aqueous solution containing 0.1 g of titanium were added to this solution that the carbon powder was dispersed. Thereafter, 6% by mass of the aqueous ammonia was dripped into this aqueous solution so that the pH (Hydrogen ion exponent) was adjusted to 6.0-8.0. Filtering and washing of this aqueous solution to obtain a carbon powder on which platinum, iron and titanium were loaded.

Reducing treatment, an alloying treatment, washing and vacuum drying were performed to this carbon powder like Example 1 to obtain a carbon catalyst powder loading a platinum-iron-titanium alloy (4).

This carbon catalyst powder loading a platinum-iron-titanium alloy (4) had a platinum loading density of 37% by mass, an iron loading density of 2% by mass and a titanium loading density of 1% by mass.

Moreover, the particle diameter of an alloy of this carbon catalyst powder loading a platinum-iron-titanium alloy (4) was measured by X-ray diffraction (XRD), it was 3.5-6.0 nm. Further, the peak position, which belongs to (111) surface of an alloy of this catalyst powder (4) in X-ray diffraction, was 40.2 degree and alloying was confirmed.

Example No. 5

By the same way as Example 4, 6.0 g of carbon powder were suspended to a solution containing 3.6 g of platinum and 0.2 g of iron. That is, 6.0 g of carbon powder were added to 1.0 L of hexahydroxy platinate nitrate solution containing 3.6 g of platinum and the carbon powder was sufficiently dispersed in this solution. Then, 0.1 L of iron nitrate aqueous solution containing 0.2 g of iron was added to the resulting solution in which the carbon powder was dispersed. Instead of titanium chloride aqueous solution, a molybdenum chloride aqueous solution containing 0.2 g of molybdenum was added. Subsequently, 6% by mass of the aqueous ammonia was dripped into this aqueous solution, and the pH (Hydrogen ion exponent) was adjusted to 6.0-8.0. Filtering and washing of this aqueous solution was carried out to obtain a carbon powder on which platinum, iron and molybdenum were loaded.

Reducing treatment, an alloying treatment, washing and vacuum drying were performed to this carbon powder like Example 1 to obtain a carbon catalyst powder loading a platinum-iron-molybdenum alloy (5).

This carbon catalyst powder loading a platinum-iron-molybdenum alloy (5) had a platinum loading density of 36% by mass, an iron loading density of 2% by mass and a molybdenum loading density of 2% by mass.

Furthermore, the particle diameter of an alloy of this carbon catalyst powder loading a platinum-iron-molybdenum alloy (5) was measured by X-ray diffraction (XRD), it was 3.0-5.0 nm. The peak position that belongs to (111) surface of an alloy of this catalyst powder (4) in X-ray diffraction was 40.2 degree and alloying was confirmed.

Example No. 6

By the same way as Example 1, 3.6 g of platinum and 0.2 g of iron were loaded on 6.0 g of carbon powder.

Reducing treatment, an alloying treatment, washing and vacuum drying were performed to this carbon powder like Example 1 to obtain a carbon catalyst powder loading a platinum-iron alloy.

This carbon catalyst powder loading a platinum-iron alloy was uniformly dispersed in 0.5 L of deionized water, and 0.2 L of ammonium tungstate para pentahydrate aqueous solution containing 0.2 g of tungsten was further added. Next, nitrate solution was dripped into the aqueous solution until the pH became 1.0 or less, and tungsten trioxide was precipitated. Filtering and washing of this aqueous solution which tungsten trioxide was precipitated was carried out to obtain a carbon catalyst powder on which a platinum-iron alloy was loaded.

Reducing treatment, an alloying treatment, washing and vacuum drying were performed to this carbon catalyst powder like Example 1 to obtain a carbon catalyst powder loading a platinum-iron-tungsten alloy (6).

This carbon catalyst powder loading a platinum-iron-tungsten alloy (6) had a platinum loading density of 36% by mass, an iron loading density of 2% by mass and a tungsten loading density of 2% by mass.

Moreover, the particle diameter of an alloy of this carbon catalyst powder loading a platinum-iron-tungsten alloy (6) was measured by X-ray diffraction (XRD), it was 2.5-4.0 nm. The peak position that belongs to (111) surface of an alloy of this catalyst powder (6) in X-ray diffraction was 40.1 degree, and alloying was confirmed.

Comparative Example No. 1

By the same way as Example 6, 3.8 g of platinum and 0.2 g of iron were loaded on 6.0 g of carbon powder.

Reducing treatment, an alloying treatment, washing and vacuum drying were performed to this carbon catalyst powder like Example 1 to obtain a carbon catalyst powder loading a platinum-iron alloy (7).

This carbon catalyst powder loading a platinum-iron alloy (7) had a platinum loading density of 38% by mass and an iron loading density of 2% by mass.

Moreover, the particle diameter of an alloy of this carbon catalyst powder loading a platinum-iron alloy (7) was measured by X-ray diffraction (XRD), it was 2.5-4.0 nm. The peak position that belongs to (111) surface of an alloy of this catalyst powder (7) in X-ray diffraction was 40.1 degree, and alloying was confirmed.

Comparative Examination

Using the resulting carbon catalyst powders (1)-(7) loading a platinum alloy, a cathode for polymer electrolyte-fuel cells were formed as follows. Namely, carbon catalyst powders (1)-(7) loading a platinum alloy, produced in the manner described above, were dispersed in a 10% Nafion solution (a product of Aldrich Corporation) and an organic solvent. Subsequently, these dispersion solutions were sprayed on a carbon cloth to form a cathode. The amount of a carbon catalyst powder loading a platinum alloy was 0.3 mg per 1 cm$^2$ of this cathode.

The cathode that formed by spraying these carbon catalyst powders (1)-(7) loading a platinum alloy, and an anode were bonded by hot-pressing with a polymer electrolyte membrane in between them to form a fuel cell.

In addition, the anode used here was formed by spraying, on a carbon paper, a catalyst that platinum was loaded on carbon black. Further, Vulcan XC72R, a product name of CABOT Corporation, was used here as carbon black. The ratio of carbon black to platinum was 40 to 60 by weight. As a polymer electrolyte membrane, Nafion, a product name of DuPont, was used. This Nafion is a polymer material having SO$_3$H group.

The electrode area of each cell composed as such was 13 cm$^2$. Then, a back pressure of 0.1 MPa was applied to the cathode and anode of this fuel cell, respectively. The cathode side was supplied with air at a flow rate of 1 L/min and the anode side was supplied with hydrogen at a flow rate of 0.5 L/min, respectively.

After repeating the cycle which the current density was increased at prefixed speed from open circuit (OCV) up to 2 A/cm$^2$ for two hours, the current density was fixed to 0.5 A/cm$^2$ and the battery voltages were assessed.

The battery voltages of fuel cells, using carbon catalyst powders (1)-(7) loading a platinum alloy, were measured respectively after 100 hours, 200 hours, 300 hours, 400 hours, 500 hours, 600 hours, 700 hours, 800 hours and 900 hours. FIG. 1 illustrates the battery voltages using carbon catalyst powders (1)-(7) loading a platinum alloy in the result of a durability examination. In addition, a carbon catalyst powder loading a platinum alloy was only abbreviated to a catalyst powder in FIG. 1.

According to FIG. 1., the batteries using carbon catalyst powders (1)-(6) loading a platinum-iron-the third element alloy had the higher durability of batteries than the battery using a carbon catalyst powder (7) loading a platinum-iron alloy. The difference in durability was obvious especially after two hours had passed. Moreover, it can be observed that after 400 hours had passed, the batteries using carbon catalyst powders (1)-(6) loading a platinum-iron-the third element alloy had the voltage more than twice as large as the voltage of the battery using a carbon catalyst powder (7) loading a platinum-iron alloy. Considering the above, the durability of a battery can be improved by employing carbon catalyst powders using an alloy that consists of platinum, iron and the third element, e.g., tungsten, titanium, molybdenum, rhenium and the like, compared to the carbon catalyst powder using an alloy that consists of platinum and iron.

Furthermore, among the batteries using carbon catalyst powders (1)-(6) loading a platinum-iron-the third element alloy, the batteries using carbon catalyst powders (1) and (6) loading a platinum-iron-tungsten alloy and the batteries using carbon catalyst powders (2) and (4) loading a platinum-iron-titanium alloy had higher durability of a battery than the batteries using carbon catalyst powders (3) and (5) loading a platinum-iron-rhenium alloy. Therefore, it was proved that tungsten and titanium are more preferable to employ as the third element to form an alloy with platinum and iron.

What is claimed is:

1. A cathode catalyst for a fuel cell, comprising:
   a supporting layer which consists of an alloy containing platinum and iron, and further containing a third component, which has an affinity for iron, wherein said third component is titanium, and wherein said alloy comprises 0.5-10 parts by weight of iron, 5-20 parts by weight of titanium, and 100 parts by weight of platinum; and
   a support on which said supporting layer is loaded.

2. The cathode catalyst for a fuel cell set forth in claim 1, wherein said support is a carbon powder.

3. The cathode catalyst for a fuel cell set forth in claim 1, wherein said fuel cell is a polymer electrolyte fuel cell.

* * * * *